United States Patent [15] 3,690,581
Wainio [45] Sept. 12, 1972

[54] REEL MOUNT

[72] Inventor: Allan C. Wainio, Maynard, Mass.

[73] Assignee: Honeywell Inc., Minneapolis, Minn.

[22] Filed: April 20, 1970

[21] Appl. No.: 29,937

[52] U.S. Cl. ..........242/68.3
[51] Int. Cl. ..........B65h 17/02
[58] Field of Search.......242/68, 68.1, 68.2, 68.3, 72, 242/72 B

[56] References Cited

UNITED STATES PATENTS

| | | | |
|---|---|---|---|
| 3,310,253 | 3/1967 | Rayfield et al. | 242/68.3 |
| 3,345,012 | 10/1967 | Ek | 242/68.3 |
| 3,124,319 | 3/1964 | Cohen et al. | 242/68.3 |
| 3,345,006 | 10/1967 | Geen | 242/68.3 X |

*Primary Examiner*—Stanley N. Gilreath
*Assistant Examiner*—Gregory A. Walters
*Attorney*—Ronald T. Reiling and Fred Jacob

[57] ABSTRACT

A reel mount for use in a tape transport having mechanical means for retaining and aligning a supply reel thereon, which is operated by fluid pressure. The reel mount comprises a hub having a resilient band expandible through movement of a plurality of collet elements arranged on the hub. Application of sub-atmospheric fluid pressure to the hub forces the collet elements along an incline to expand the resilient band, and cause the band to grip a reel located on the hub, while a plurality of plungers simultaneously serve to locate the reel in alignment on the hub.

5 Claims, 3 Drawing Figures

INVENTOR
ALLAN C. WAINIO
BY
ATTORNEY

INVENTOR
ALLAN C. WAINIO
BY

ATTORNEY

REEL MOUNT

BACKGROUND OF THE INVENTION

The present invention relates generally to apparatus for handling reels having elongated flexible tape stored thereon, and more particularly to a new and improved reel mount which is effective to retain the reel in driving engagement and in proper alignment.

In present day magnetic tape transports for use with computers, it is common practice to have tape reels which are removable such that different computer programs and other information may be preserved in a library of tapes, each spooled on its own tape reel. These reels are generally stored in racks from which they are removed by the operator during operation of the computer, when the particular information is required. An operator in the process of changing tapes in most instances is called upon to remove a tape from the supply reel hub and deposit a new tape on the hub, preferably within a minimum of time lapse, and with a minimum of operator effort.

It is further well-known that the operation of a high speed data transport imposes relatively severe requirements on the capabilities of a reel mount to hold the tape reel in place. Both rapid acceleration and deceleration of the tape reel occurs when a tape reel is brought up to speed from a dead stop, or when it is brought to a rapid halt. These accelerations and decelerations are extremely large when a reversal in the direction of reel rotation is called for. Of prime importance therefore, is the capability of the reel mount to hold the tape reel securely in position during operation of the tape transport, in addition to the aforementioned requirement for ease of removal and installation of the tape reel by the operator. Further, to the above requirements demanded of a reel hub when used in a high speed tape transport, there is yet another requirement, that of aligning the reel on the mount such that when the reel is placed in its operative position, the tape unwound therefrom will be directed precisely toward the capstan or driving media.

While various arrangements both of a mechanical nature, and employing fluid pressure, have been suggested for reel mounts of the type described, a need is still present for a reel mount which will ideally accept a tape reel disposed on the hub by the operator, provide locking engagement to the reel, which engagement will withstand the rigors of a rapid acceleration and deceleration, and which will additionally align the reel on the mount in a precise manner.

Tape transports which have used sub-atmospheric pressure to approach the above mentioned ideal conditions are shown in U. S. Pat. Nos. 2,998,206 and 3,145,944 issued to Robert A. Pendleton, and assigned to the assignee of the present invention. While these arrangements have met with wide acceptance and success in high speed tape transport applications, with the introduction of smaller width tape sizes (such as one half inch) and the resultant smaller width of tape reel, tape reels of various configurations having holes and distortions in their flanges, it is often difficult to provide the force necessary to retain the reel in driving engagement with the hub, through application of vacuum directly to the tape reel. To overcome this difficulty and provide a reel mount compatible with most known tape reels, a mechanical retaining force in combination with vacuum is suggested by the present invention.

It is therefore an object of the present invention to provide a reel mount which facilitates loading and unloading of a tape reel into a tape transport system.

A further object of the invention is to provide a reel mount having a mechanically induced force applied to the reel for gripping the reel onto the hub, which force is induced and maintained by fluid pressure.

Yet another object of the invention is to provide a reel mount wherein a reel is both firmly gripped on the hub for rotation thereby and aligned on the hub by a single operation.

SUMMARY OF THE INVENTION

The above objects, as well as other objects which will become apparent as the description proceeds, are achieved by providing a reel mount having a hub rotated by a powered shaft for driving a reel, and further having resilient means for contacting an inner surface of a reel placed on the mount. A fluid pressure source is provided to the reel mount which when activated causes the resilient means to move into gripping engagement with a reel placed on the mount. As another aspect of the invention, in combination with the aforementioned features, a reel aligning means is provided which is simultaneously operated by the fluid pressure means to properly align the tape reel on the mount.

BRIEF DESCRIPTION OF THE DRAWINGS

The aforementioned objects of the present invention, together with features and advantages thereof, will become apparent from the following detailed description when read together with the accompanying drawings, in which.

DESCRIPTION OF THE PREFERRED EMBODIMENT

Figure 1:
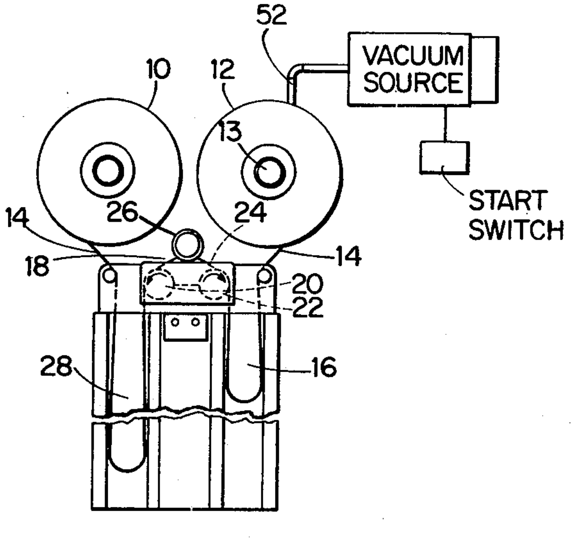
FIG. 1 is an illustrative schematic view showing a magnetic tape handling device in which the preferred reel mount embodiment of the present invention is advantageously employed.

Referring now to FIG. 1 of the drawings, there is illustrated a tape transport device having a first reel 10 and a second reel 12, either or both of which may be provided with a reel mount in accordance with the present invention. However, for the purposes of the present description, only the reel 12 (which will be designated as the tape supply reel) is shown to be provided with a hub 13 constructed in accordance with the present invention, while the reel 10 (which will be designated as the take-up reel) is shown as mounted on any conventional hub. In the apparatus shown, a magnetic tape 14 is wound on the reels 10 and 12 and with the reel 12 serving as a supply reel, the tape 14 is adapted to be transported from the reel 12 into a first loop chamber 16, the latter providing a desired amount of slack in the tape between the reel 12 and a data transfer mechanism 18. Advantageously, the data transfer mechanism 18 comprises a pair of contrarotating capstans 20 and 22 respectfully, and a brake 24, all being used to control the movement of the tape 14 under a data transfer head 26. A further loop chamber 28 is provided on the opposite side of the data transfer mechanism 18, and it also provides slack in the tape 14 between the data transfer mechanism 18 and the reel 10. Those skilled in the art will appreciate that, if desired, the loop chambers 16 and 28 may be provided with a sub-atmospheric pressure or vacuum through suitable ports to maintain a sub-atmospheric pressure below the loop of the tape in the loop chambers. One such mechanism for driving magnetic tape of the type described is set forth in greater detail in the U. S. Pat. No. 2,866,637 to R. A. Pendleton and assigned to the assignee of the present invention. While the novel reel mount 13 has been shown for illustrative purposes as combined with the aforementioned particular structure, it will be evident to those skilled in the art that the application of the reel mount 13 to any well-known tape drive configuration may be accomplished with the resultant enhancement of the device through the many advantages provided by the reel mount 13.

Figure 2:
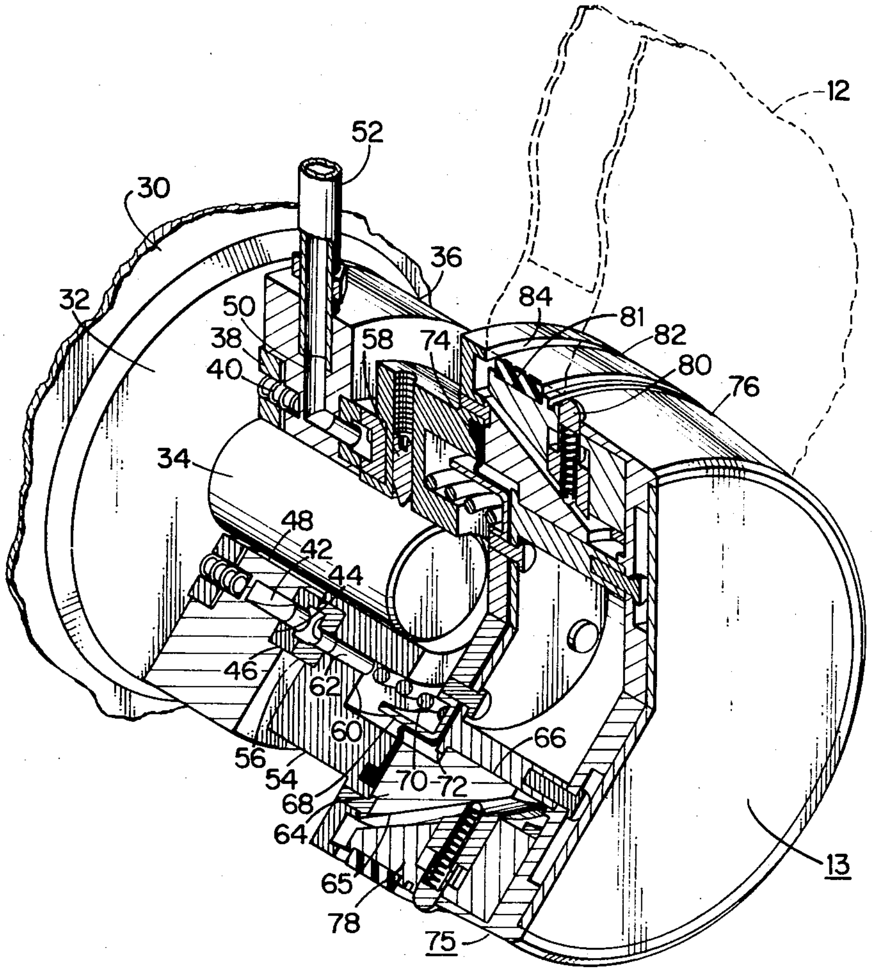
FIG. 2 is a perspective view, partially in section, showing details of the reel mount embodiment of FIG. 1, taken on an enlarged scale for clarity.

Referring now to FIG. 2, taken in conjunction with FIG. 1, the reel hub 13 is shown in what will be hereinafter referred as the unactivated condition, that is, in a condition for the receiving, or removal of a tape reel. A drive motor having a motor housing 30 is located in the usual manner in the tape transport device for driving the tape reel 12 mounted on the reel mount 13. The drive motor 30 is provided with a face plate 32 through which a drive shaft 34 extends, the motor being operative to rotate the shaft 34 relative to the stationary housing 30. A stationary ring 36 is received on an annular coupling member 38 of the face plate 32 and retained in locking engagement by virtue of a plurality of compression springs 40 which serve to bias the ring outwardly from the coupling member. The ring 36 is provided with an annular groove 42 which has a shoulder portion 44 into which is received a carbon seal ring 46. Through the center of the ring 36 there is formed a circular bore 48 for receiving the shaft 34, the bore being dimensioned to provide clearance for rotation of the shaft extending therethrough. A radial bore 50 extends from the circumferential surface of the ring 36, communicating with the annular groove 42, and a tubular member 52 as connected into the bore 50. A mounting block 54 having a carbon seal ring 56 similar to ring 46 is slidably received on the shaft 34 and is affixed to the shaft by virtue of locking engagement between a set screw 58 and the shaft. An annular chamber 60 is formed in the block 54 and has a plurality of holes 62 leading from the chamber to the carbon seal ring 56. Each of the seal rings 46 and 56 are provided with a plurality of holes which communicate with the annular groove 42 and the holes 62, respectively.

Thus, it will be observed from the foregoing that rotation of the drive shaft 34 is effective to rotate the block 54, relative movement taking place between the ring 46 and the ring 56, which are in sealing engagement. During this rotation, there is maintained a through passage from the tubular member 52 to the chamber 60 through the radial bore 50, the annular groove 42, the seal rings 46, 56, and the holes 62.

Adjacent the outer surface of the block 54 there is mounted a cam ring 64 having an inclined surface 65. A hollow sleeve 66 having a piston 68 extending into the chamber 60, is slidably received by the cam ring 64 for axial movement relative to the block 54. As will be noted, a compression spring 70 located in the chamber 60 serves to bias the piston 68 outwardly from the chamber, the piston 68 and sleeve 66 being retained in the chamber by engagement of a flanged portion 72 of the sleeve with the cam ring 64. A fluid tight seal is maintained in the chamber 60 by means of a diaphragm 74 which is received in sealing engagement between the block 54 and the cam ring 64, the diaphragm extending between the piston 68 and the sleeve 66.

At the outermost end of the assembly, an end cap 75 is fastened to the sleeve 66 and is provided with a flange 76 which extends inwardly over, and in radially spaced relation with, the cam ring 64. Retained between the flange 76 and the inclined surface 65 of the ring 64 is a plurality of collet elements 78 having a surface for slidable engagement with the surface 65. In the embodiment shown, there are six identical elements 78 three of which each contain a plunger 80 which is slidable with a respective element 78, and is spring biased radially outwardly, extending through an opening in the flange 76 of the end cap 75. Each of the plungers 80 has a spherical surface extending adjacent the flange 76. This spherical configuration is effective as a cam surface during operation of the present invention, which will be further described in detail hereinbelow.

Each of the collet elements 78 further has a groove 81 formed therein into which is received a resilient band 82 of rubber, or rubber-like plastic material. The resilient band 82 is positioned between the end of the flange 76 and a guide surface 84 of the block 54. From a review of the structure thus far described, it will be apparent that the collet elements 78 when moved rearwardly along the surface 65 are effective to cause the plungers 80 to likewise move rearwardly along the surface 65, which incline forces the band 82 to expand as well as the plungers 80 to move outwardly through the openings in the flange 76.

For a typical sequence of operation, reference should again be had to FIG. 1, wherein the reader will note that the tubular member 52 is connected to a vacuum source which is operated by means of a start switch located on the tape transport cabinet (not shown). It should be here understood that while the schematic representation shown in FIG. 1 is in its simplest form, the start switch is generally effective to control the drive motor, and in some instances an entire sequence of automatic threading and operation of the tape transport through its connection with various circuit elements which have been herein omitted. For a further description of a system of this type, reference should be had to the copending U. S. Pat. application of Charles Tolini et al. Ser. No. 29,935 filed Apr. 20, 1970 and assigned to the assignee of the present invention. For simplification, however, in the present disclosure it is considered sufficient to indicate that operation of the start switch is effective to energize the vacuum source, thus creating a sub-atmospheric pressure in the line 52.

In describing a sequence of operation of the device, let us assume that an operator approaches the tape transport device with the objective of changing a reel on the hub 13. The vacuum source has been inactivated, and the hub 13 is in the condition shown in FIG. 1 with the reel 12 freely supported on the band 82. The operator while holding the new reel in one hand may merely remove the reel 12 from the hub 13 with the free hand and place the new reel on the hub. The operator now by pressing the start switch initiates operation of the vacuum source, which is effective to cause a sub-atmospheric pressure in the radial bore 50, the annular groove 42, the space between the seal rings 46, 56, the holes 62, and the chamber 60.

Figure 3:
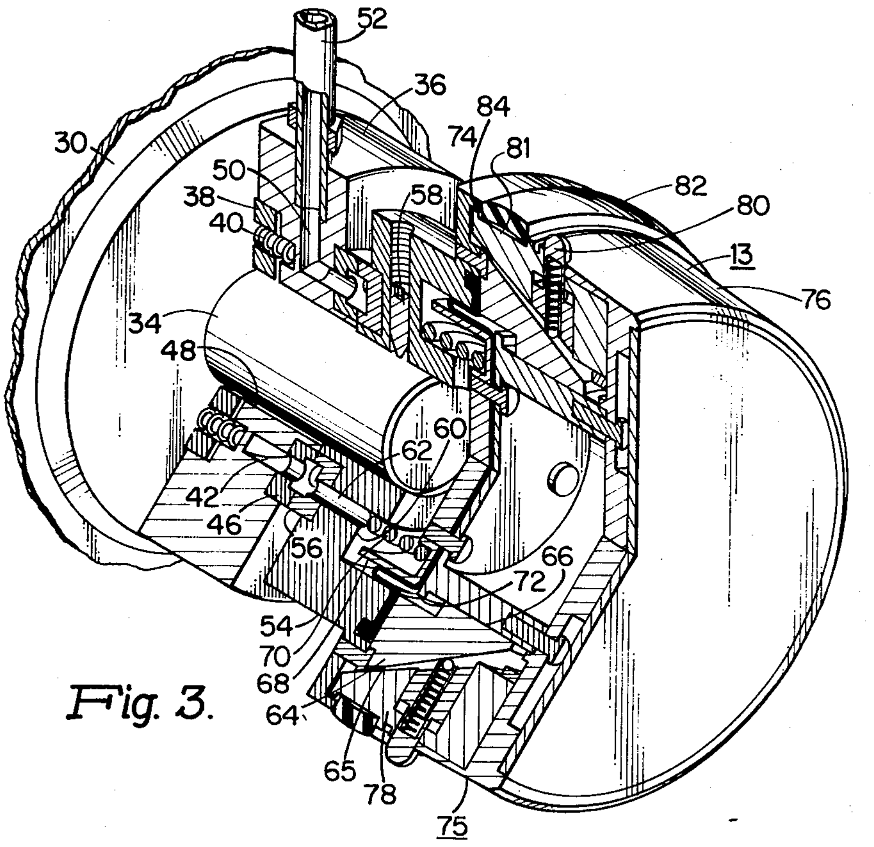
FIG. 3 is a perspective view, partially in section and similar to FIG. 2, showing various reel mount elements of FIG. 2 as repositioned during operation of the embodiment.

Referring now to FIG. 3, taken in conjunction with FIG. 2, it will be noted that a vacuum created in the chamber 60 is effective to draw the piston 68, and consequently the hollow sleeve 66, inwardly against the spring 70 resulting in the elements 78 being moved inwardly, and radially outwardly, along the inclined surface 65 of the cam ring 64. As the elements 78 are set in motion, the spherical surfaces of the extensible plungers 80 contact the outer surface of the reel forcing the reel into alignment against the surface 84, while coincident expansion of the band 82 is starting to exert a gripping force on the reel. With the hub 13 in the condition shown in FIG. 3, the band 82 is fully compressed against the inner surface of the reel, which has been aligned against the surface 84 by the plungers 80. It should be understood that in the present device, the hub 13 will remain in this condition until vacuum is removed from the chamber 60. With the reel so secured to the hub 13 as shown in FIG. 3, rotation of the drive motor shaft 34 serves to drive the reel 12, the reel being held firmly on the reel hub 13 by the resilient band 82 which is effective to retain the reel against high inertial effects of acceleration. In the present embodiment, the sub-atmospheric pressure must be retained in the chamber 60 during operation of the tape transport to maintain the configuration of FIG. 3. When the transport is shut-down, a valve (not shown) either located at the vacuum source or at some location in the tubular member 52 is automatically opened to atmosphere, thereby admitting atmospheric pressure to the chamber 60. The hub 13 then returns to the condition as shown in FIG. 2, from which the tape reel is easily removed.

From the foregoing description, it should be evident that the various objectives of the present invention are achieved by providing a reel hub of relatively simple construction which is effective to both align and grip a tape reel for movement in a tape transport, and which through its general arrangement and operation, allows an operator to change tape reels with a degree of speed and efficiency which is compatible with the environment in which the device is employed.

It will be apparent that numerous modifications and departures, as explained above, will occur to those skilled in the art all of which follow within the true spirit and scope contemplated by the present invention.

What is claimed is:

1. A reel mount for use in a tape transport comprising;

a powered shaft for driving a reel disposed on said mount, a cylindrical member disposed at the end of said shaft and in rotatable engagement therewith, said cylindrical member being axially slidable with respect to said shaft, a ring disposed about the circumference of said cylindrical member and having an outer surface inclined with respect to said shaft axis, a collet comprising a plurality of collet elements disposed about said ring and slidably contacting said inclined surface, a circular band of resilient material disposed around said collet and having an inner surface engaging said collet and an outer surface for contacting a reel placed on said mount, means interconnecting said cylindrical member with said collet for moving said collet axially along said ring inclined surface in response to axial movement of said cylindrical member, and means for axially moving said cylindrical member from a first position to a reel locking position wherein said collet and said resilient band are located radially outwardly in the reel locking position by movement of said collet along said inclined surface.

2. A reel mount as set forth in claim 1 wherein said interconnecting means comprises a flange disposed on said cylindrical member having a first portion extending radially outwardly with respect to said shaft axis to engage said collet and cause said collet to move along said inclined surface by movement of said member, and a second portion extending about said ring and spaced from said inclined surface with said collet disposed therebetween, said second portion retaining said collet adjacent said ring surface during slidable movement of said cylindrical member.

3. A reel mount as set forth in claim 1 which further includes means biasing said cylindrical member toward said first position.

4. A reel mount as set forth in claim 2 which further includes a plurality of plunger elements slidably disposed on said ring inclined surface and each extending through radially aligned openings formed in a respective collet element and said second portion of said cylindrical member flange, said mount further having a planar surface extending substantially normal to the axis of rotation of said shaft and adjacent said band of resilient material whereby slidable movement of said plunger elements along said inclined surface is effective to move said elements radially outwardly from said shaft axis to engage a reel disposed on said mount and force the reel against said planar surface for proper alignment on said mount.

5. A reel mount as set forth in claim 1 wherein said means for axially moving said cylindrical member comprises a source of fluid pressure.

* * * * *